United States Patent [19]

Ascani, Jr. et al.

[11] 4,406,393
[45] Sep. 27, 1983

[54] METHOD OF MAKING FILAMENTARY REINFORCED METALLIC STRUCTURES

[75] Inventors: Leonard A. Ascani, Jr., Palos Verdes Estates; Billy A. Burroughs, Los Angeles, both of Calif.

[73] Assignee: Rockwell International Corporation, El Segundo, Calif.

[21] Appl. No.: 246,490

[22] Filed: Mar. 23, 1981

[51] Int. Cl.³ .............................................. B23K 31/02
[52] U.S. Cl. .................................... 228/157; 228/190; 228/193
[58] Field of Search ............... 228/157, 190, 193, 265; 29/156-158 B

[56] References Cited

U.S. PATENT DOCUMENTS

| | | | |
|---|---|---|---|
| 3,711,936 | 1/1973 | Athey et al. | 29/419 X |
| 3,927,817 | 12/1975 | Hamilton et al. | 228/157 |
| 3,991,928 | 11/1976 | Friedrich et al. | 228/190 |
| 4,010,884 | 3/1977 | Rothman | 228/190 |
| 4,087,037 | 5/1978 | Schier et al. | 228/157 X |
| 4,163,380 | 8/1979 | Masoner | 29/419 X |
| 4,197,977 | 4/1980 | Deminet | 228/157 X |
| 4,217,397 | 8/1980 | Hayase et al. | 228/157 X |

Primary Examiner—Gus T. Hampilos
Assistant Examiner—M. Jordan
Attorney, Agent, or Firm—Charles T. Silberberg

[57] ABSTRACT

A method of making filamentary reinforced metallic structures is disclosed. The method uses a stack of workpieces having two principal opposed surfaces. At least one of the outer workpieces comprises at least one inner sheet made of a metal matrix material reinforced with filamentary material and two cover sheets which sandwich the inner sheets and which extend beyond the periphery of the at least one inner sheet. Selected area of the workpieces are treated to prevent bonding at those areas. The workpieces are stacked and positioned between shaping members such that they enclose at least one chamber of at least one of the shaping members. The workpieces are heated to a temperature sufficient to produce diffusion bonding at preselected untreated areas and compressive pressure is applied, both of which are maintained for a sufficient time so as to consolidate the at least one outer workpiece into a single sheet workpiece comprising an interior reinforced portion with a peripheral monolithic portion and to diffusion bond the stack at the untreated areas. Alternately the stack can be press diffusion bonded prior to insertion into the forming apparatus. After bonding, tensile stress is induced, preferably by gas pressure, in at least one consolidated workpiece causing at least a portion of the peripheral monolithic portion to expand superplastically against and into intimate contact with at least one of the shaping members.

12 Claims, 13 Drawing Figures

METHOD OF MAKING FILAMENTARY REINFORCED METALLIC STRUCTURES

BACKGROUND OF INVENTION

A. Field of the Invention

The invention relates to the field of metal forming, and particularly to a method of making metallic sandwich structures incorporating filamentary reinforcements by superplastic forming and diffusion bonding.

B. Description of Prior Art

It has been known for many years that certain metals, such as titanium, and other alloys, exhibit superplasticity. Superplasticity is the capability of a material to develop unusually high tensile elongations with a reduced tendency toward necking. This capability is exhibited by only a limited number of metals and alloys, and within limited temperature and strain rate ranges. For example, some titanium alloys such as Ti-6Al-4V have been observed to exhibit superplastic characteristics.

Until the advent of viable superplastic forming techniques, taking advantage of this property to form complex configurations requiring large tensile elongations was extremely difficult or, in some instances, not possible. A significant breakthrough in superplastic forming was made by Hamilton, et al., disclosed in U.S. Pat. No. 3,934,441, "Controlled Environment Superplastic Forming", incorporated into this specification herewith by reference. Simplified, the process involves placing a worksheet or blank and a shaping member in a chamber preferably with an inert gas environment. The blank is heated to a temperature where it exhibits superplastic characteristics whereafter pressure is applied to the blank, causing it to stretch and form about the shaping member.

Diffusion bonding refers to the metallurgical joining of surfaces of similar or dissimilar metals by applying heat and pressure for a sufficient time so as to cause co-mingling of the atoms at the joint interface. Diffusion bonding is accomplished entirely in the solid state at or above one-half the base metal melting point. Actual times, temperatures and pressures will vary from metal to metal.

The combining of superplastic forming and diffusion bonding (SPF/DB) in the making of metallic sandwich structures has been successfully accomplished and is disclosed in U.S. Pat. No. 3,927,817, "Method of Making Metallic Sandwich Structures," by Hamilton, et al., and is herewith also incorporated herein by reference.

Basically, the Hamilton, et al. method for making metallic sandwich structures involves fabricating the structures from a plurality of metal blank workpieces. One or more of the blanks are treated in the selected areas not to be diffusion bonded. The blanks are positioned in a stacked relationship and placed in a forming apparatus in the form of a die assembly. The stack is diffusion bonded together at the untreated areas and at least one of the blanks is superplastically formed against one or more of the die surfaces forming the sandwich structure. The core configuration is determined by the location, size, and shape of the joined areas.

While the Hamilton, et al. SPF/DB process has demonstrated cost and weight reductions, considerable competition has been received from structures made from advanced epoxy matrix composite materials because of their light weight and selected high strength and stiffness characteristics. Thus, the main application of SPF/DB fabricated parts has been in high temperature applications where the epoxy system is unuseable. The incorporation of the filamentary material also increases the operational temperature range for conventional titanium structures in that the filamentary material maintains its strength at temperatures that begin to weaken the titanium. Thus, if metal matrix technology could be applied to the SPF/DB process, the number of probable structures thus fabricated would be greatly enlarged.

Metal matrix composite materials are far from new; for example, U.S. Pat. No. 3,991,928, "Method of Fabricating Titanium Alloy Composite Materials," by L. A. Freidrich, et al. discloses such a method. Typically, silicon carbide or boron filaments are sandwiched between layers of titanium alloy sheets. The filaments are initially positioned on a matrix material by means of adhesive bonding; i.e., a suitable plastic such as polystyrene is employed to maintain the fibers in an evenly-spaced parallel orientation. The plastic material is selected such that it will evaporate during the consolidation step. Consolidation is accomplished by heating to a high temperature, and pressing under high pressures in the range of 5,000 to 25,000 pounds per square inch. Typically, the stacked material is sealed in a retort upon which a vacuum is drawn prior to pressing. Such material has extremely high modulus and strength to weight ratios, and thus are capable of producing a light and rigid structure.

U.S. Pat. No. 4,163,380, "Forming of Pre-consolidated Metal Matrix Composites," by Massner discloses a method of forming metal matrix composite material by placing the material between a pair of dies, heating and thereafter closing the dies at a rate of 5–10 mils per minute. Since, the composite material is not in the superplastic temperature range, forming pressures are exceeding high. Therefore, this process has the disadvantage of requiring large presses and expensive high strength dies.

Up until now, it was not thought possible to incorporate metal matrix composites into structures formed by the SPF/DB process because of the high strain rates produced; i.e., on the order of $1 \times 10 - 4$ inch/inch/second. Such strain rates if applied to metal matrix composites would cause breakage of the filaments. Breakage occurs because of the adherence of the metal matrix material to the filaments, which when superplastically formed, would cause very high tensile loads to be induced into the filaments.

Therefore, it is a primary object of this invention to provide a method of making lightweight structures having increased strength and stiffness.

Another object of this invention is to provide a method of making structures incorporating metal matrix composite materials by superplastic forming/diffusion bonding.

A still further object of this invention is to provide a method of making superplastically formed/diffusion bonded structures having selected strength reinforcement.

SUMMARY OF THE INVENTION

The invention is a method of making filamentary reinforced metallic structures. The method comprises providing a plurality of workpieces having two principal opposed surfaces. At least one of the outer workpieces comprises at least one inner sheet with at least a portion made of a metal matrix material reinforced with filamentary material and two cover sheets which sandwich the inner sheet. At least one of the cover sheets extends beyond the periphery of the reinforced portion of the inner sheet. Preferably, the at least one inner sheet incorporates a monolithic portion about its periphery which effectively frames the reinforced portion.

Selected areas of the workpieces are treated to prevent bonding at those areas. The workpieces are stacked and positioned between shaping members such that they enclose at least one chamber of at least one of the shaping members. The workpieces are then heated to a temperature sufficient to produce diffusion bonding at the preselected untreated areas and a compressive pressure is applied, both of which are maintained for a sufficient time so as to consolidate the at least one outer workpiece into a workpiece comprising an interior reinforced portion with a peripheral monolithic portion and to diffusion bond the workpieces at the preselected areas. Thereafter, tensile stress is induced in at least one consolidated workpiece causing at least a portion of the peripheral monolithic portion to expand superplastically against and into intimate contact with at least one of the shaping members.

The novel features which are believed to be characteristic of the invention both as to its organization and its method of operation together with further objects and advantages thereof, will be better understood from the following description in connection with the accompanying drawings in which a presently preferred embodiment is illustrated by way of example. It is to be understood, however, that the drawings are for purposes of illustration and description only, and are not intended as a definition of the limits of the invention.

BRIEF DESCRIPTION OF DRAWINGS

Illustrated in FIG. 1 is an exploded perspective view of a three-workpiece stack to be formed into a sandwich structure.

Illustrated in FIG. 2 is a cross-sectional view of the stack shown in FIG. 1 with the workpieces stacked together.

Figure 1:
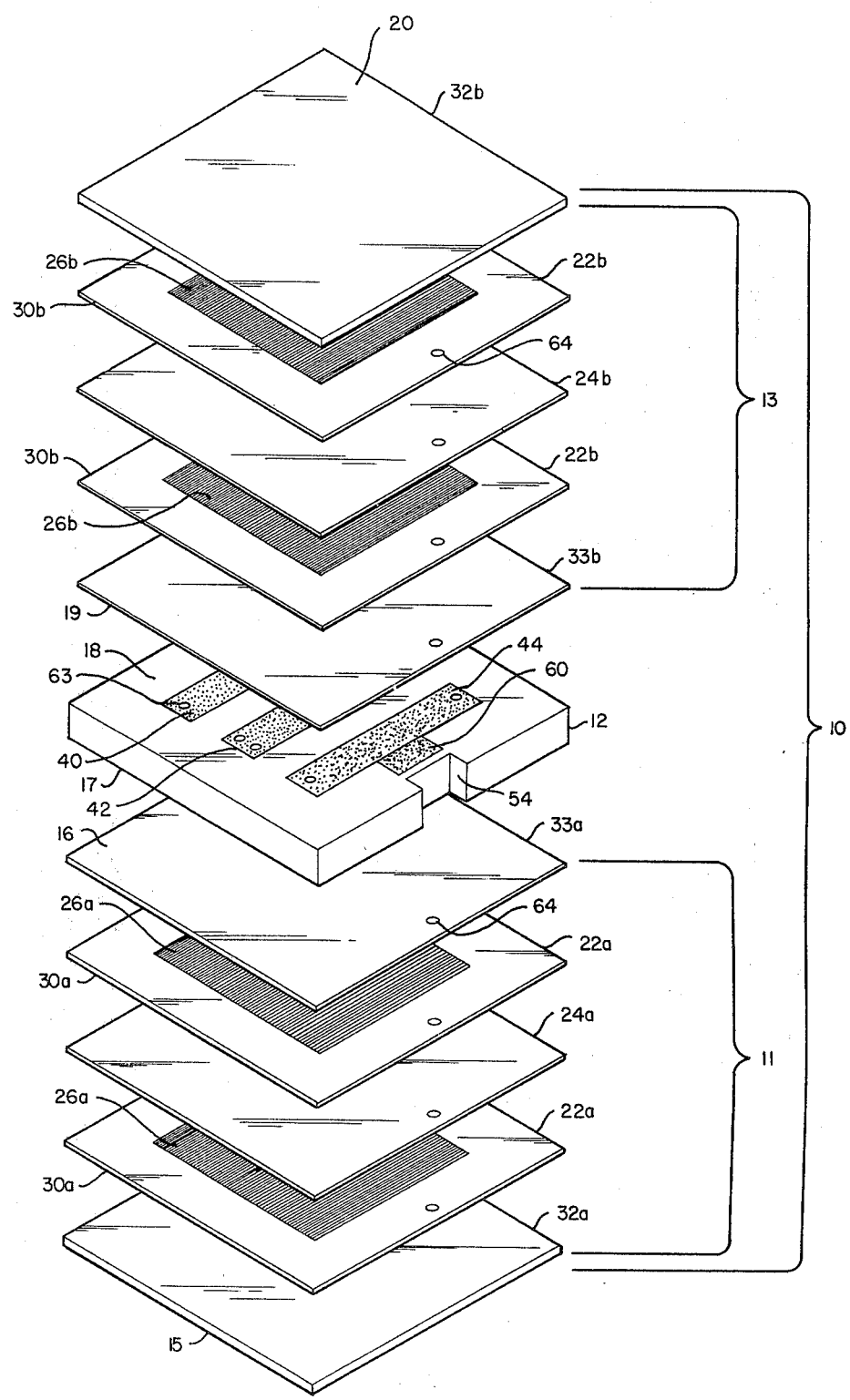
Figure 2:
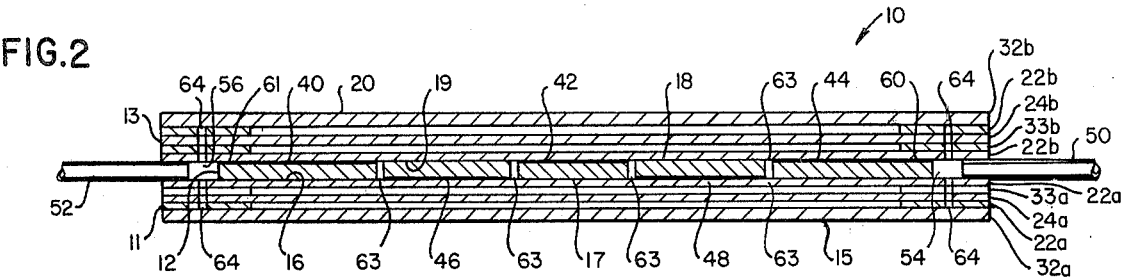
Figure 3:
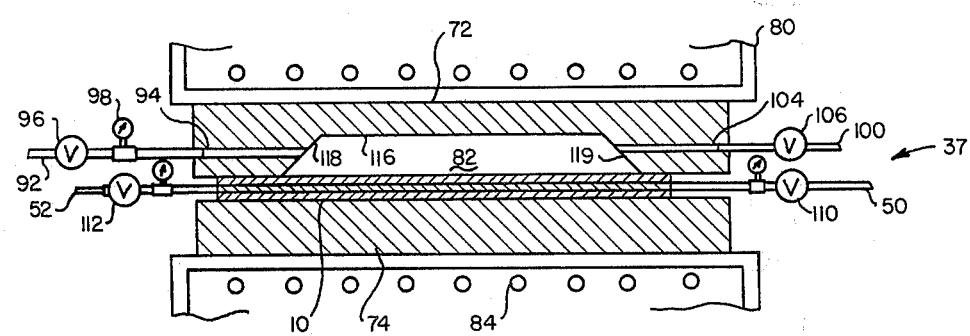

Illustrated in FIG. 3 is a cross-sectional view of the stack shown in FIGS. 1 and 2 installed in a forming apparatus.

Figure 4:
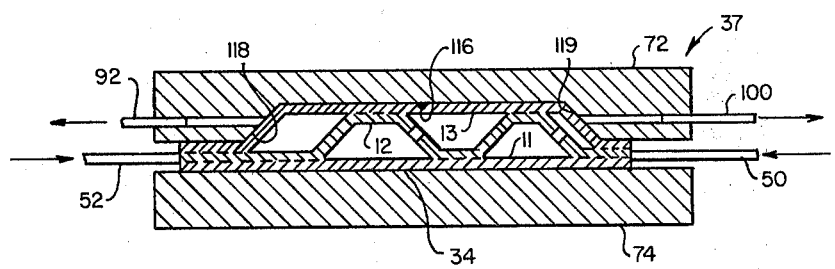

Illustrated in FIG. 4 is a completed sandwich structure enclosed within the forming apparatus, shown in FIG. 3.

Figures 5, 6:
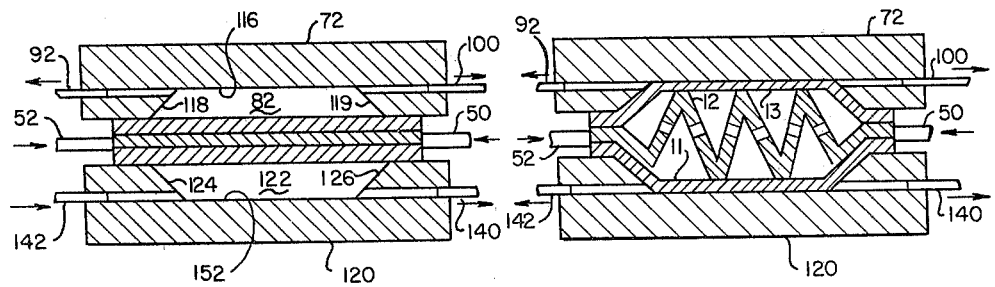

Illustrated in FIG. 5 is a cross-sectional view of the stack shown in FIG. 2 installed within a forming apparatus with both shaping members having cavities.

Illustrated in FIG. 6 is a stack shown expanded into the forming members of the apparatus shown in FIG. 5.

Figure 7:
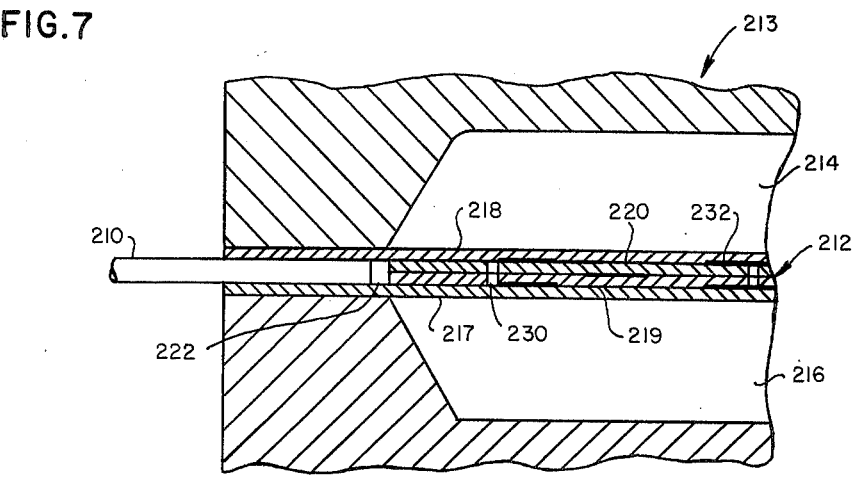

Illustrated in FIG. 7 is a partial cross-sectional view of a four-workpiece stack enclosed within a forming apparatus.

Figure 8:
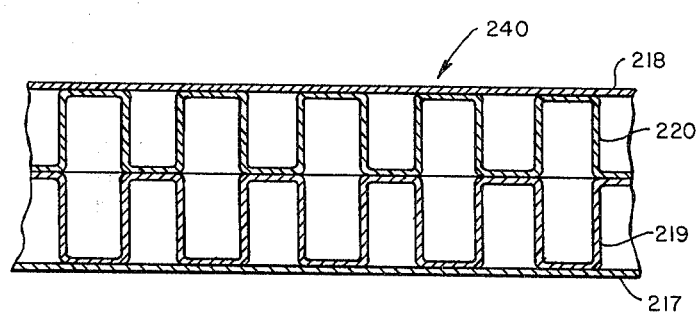

Illustrated in FIG. 8 is a partial cross-sectional view of the stack shown in FIG. 7 expanded to form a sandwich structure.

Figure 9:
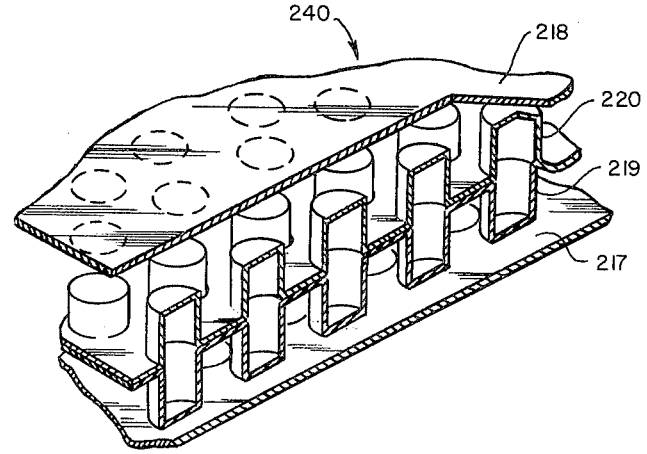

Illustrated in FIG. 9 is a partial, perspective cross-sectional view of the expanded stack shown in FIG. 8.

Figure 10:
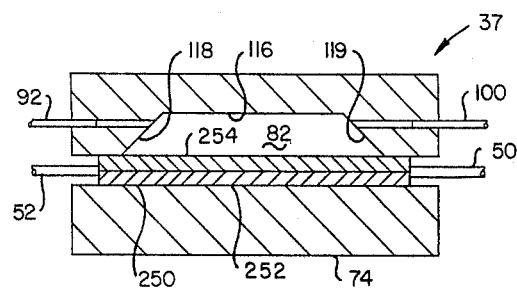

Illustrated in FIG. 10 is a cross-sectional view of a two workpiece stack installed in the forming apparatus shown in FIG. 4.

Figure 11:
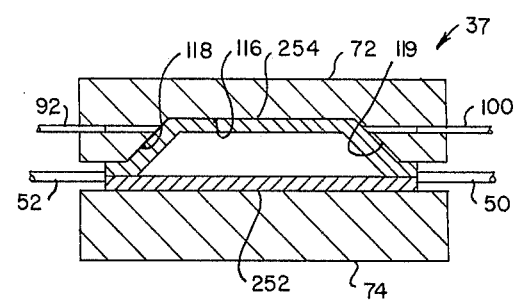

Illustrated in FIG. 11 is a cross-sectional view of a completed two workpiece structure expanded within the forming apparatus shown in FIG. 10.

Figure 12:
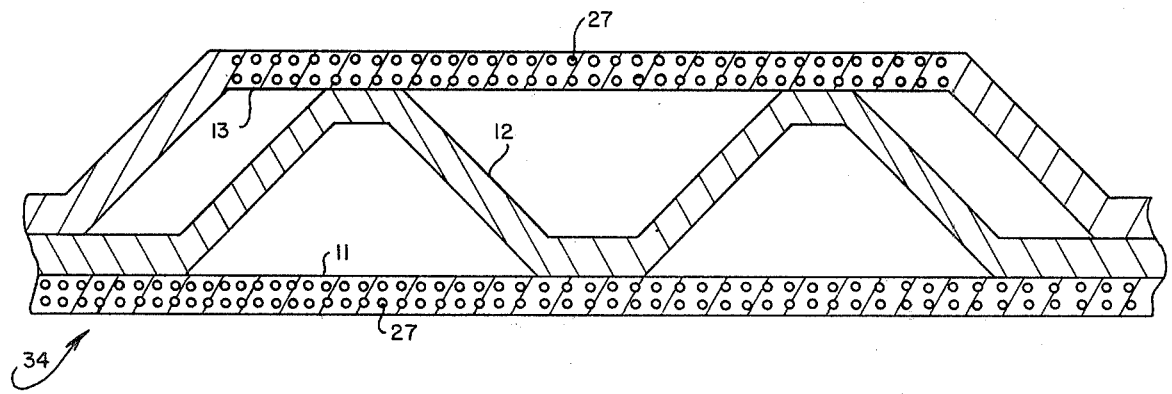

Illustrated in FIG. 12 is a fragmentary cross-sectional view of the completed sandwich structure shown in FIG. 4.

Figure 13:
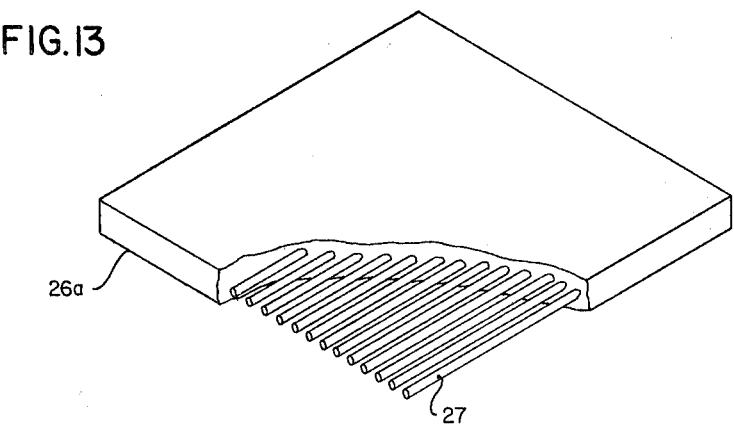

Illustrated in FIG. 13 is a perspective view with a portion broken away of the inner portion 26a of the composite sheet 22a shown in FIG. 1.

DESCRIPTION OF PREFERRED EMBODIMENT

Illustrated in FIG. 1 is an exploded perspective view of a stack 10 made up of metal workpieces or blanks 11, 12, and 13, which are to be formed into a sandwich structure according to the present invention. The blanks 11, 12, and 13 are shown stacked in FIG. 2 and are, preferably, in the form of sheets having lower and upper opposed principal surfaces 15 and 16, 17 and 18, and 19 and 20, respectively. The number of blanks used will vary depending upon design requirements; however, a minimum of two blanks must be utilized and normally three or more blanks would be used. The metal blanks must have the ability to be joined by diffusion bonding. At least one of the outer blanks and most likely the inner blanks must be of a metal having superplastic characteristics i.e., having a microstructure and composition such that when heated to within an appropriate temperature range and formed within an appropriate range of strain rate, the metal exhibits usually high tensile elongation with reduced tendency toward necking. A discussion of superplastic characteristic materials and the method of forming metallic structures by the SPF/DB process is disclosed in U.S. Pat. No. 3,926,817, "Method Of Making Metallic Sandwich Structures," by Hamilton, et al. See also U.S. Pat. No. 4,233,831, "Method for Superplastic Forming," by Hamilton, et al.

Any metal that exhibits superplastic characteristics within a workable temperature range can be used for such blanks, but the present invention is particularly concerned with metals that exhibit superplastic characteristics within the temperature range required for diffusion bonding; for example, titanium or alloys thereof, such as Ti-6Al-4V.

In the past, the outer blanks of 11 and 13 were typically homogeneous materials. In the present invention, the outer blanks 11 and 13 are of a multiple sheet configuration composed of composite sheets 22a and 22b, respectively, separated by foil sheets 24a and 24b, respectively which insures that the filamentary meterials in the two sheets 22a and 22b remain separated upon compaction. Sheets 22a and 22b include inner portions 26a and 26b, respectively, made of a metal matrix material incorporating filamentary reinforcements. Referring to FIG. 13 which is a perspective view of portion 26a shown in FIG. 1 partially broken away to show the filamentary material indicated by numeral 27. Typically, the filamentary material is boron or silicon carbide. The orientation of the filaments as well as the number of layers of filaments will vary depending upon the strength requirements of the structures to be fabricated. But generally, the inner portions 26a and 26b comprise a monolayer of filamentary material. These inner portions 26a and 26b can be fabricated by the method disclosed in U.S. Pat. No. 3,991,928, "Method Of Fabricating Titanium Alloy Matrix Composite Material," by L. A. Friedrich, et al. This type of material is available from D.W.A. Composites Specialties, Inc. and Americom, Inc., both located in Chatsworth, Ca.

Preferably, surrounding the inner portions 26a and 26b are frame portions 30a and 30b, respectively, made of the same material as the matrix material of the inner portions i.e., Ti-6A-4V. This will insure a uniform thickness in the outer workpieces after the step of diffusion bonding. If frame portions 30a and 30b are not used, the outer blanks 11 and 13 will not be of a uniform thickness because some metal must flow into the space about the inner portions 26a and 26b. Completing the workpieces 11 and 13 are cover sheets 32a and 33a, and 32b and 33b, respectively which are also normally of the same material as the matrix materials. Typical thicknesses of the composite sheets 22a and 22b are 0.010 inch; for foil sheets 24a and 24b the typical thickness is 0.0018 inch; and for the cover sheets 32a and 33a, and 32b and 33b, the typical thickness is 0.005 inch. Thus, the typical total thickness of each blank 11 and 13 (as illustrated in FIG. 1) equals 0.0518 inch. While the thickness of the cover sheets may vary, the monolayer composite sheets 22a and 22b and homogeneous sheets 24a and 24b, normally remain constant regardless of the type of structure being formed. This is because the sheets 22a and 22b are easier to form if their thickness is kept as small as possible, i.e, just sufficient to totally cover the filimentary material. While two each of composite sheets 22a and 22b are shown, design requirements may dicate only one each of such sheets, eliminating the need for sheets 24a and 24b. Conversely, there may be designs that require more than two composite sheets in an outer workpiece. In this latter case, a sheet 24a or 24b would normally be placed between each composite sheet.

Illustrated in FIG. 4 is a completed metal sandwich structure designated by numeral 34 formed from the stack 10 shown in a forming apparatus 37. It can be seen that the sandwich structure 34 has blank (workpiece) 12 joined at selected locations to both blanks 11 and 13. Referring back to FIGS. 1 and 2, in order to only join at selected locations on the blanks, a preferred procedure is to apply a suitable stopoff material to those areas within the stack 10 where no attachment or joining between the blanks is desired. Thus, areas 40, 42, 44, 46 and 48 on principal surfaces 17 and 18 of the blank 12 are coated with a stopoff material to prevent bonding in those areas. A preferred stopoff material is yttria ($Y_2O_3$), which can be applied by spraying, painting, or silk screening techniques. It should be noted that the stopoff could be applied to the principal surfaces 16 and 19 of the blanks 11 and 13, respectively, but it has been found that it is simpler to apply the coating to blank 12 and the accuracy of the structures produced is increased.

For expansion of the stack 10 to the configuration shown in FIG. 4, hollow inflation tubes 50 and 52 are inserted into notches 54 and 56, respectively, in blank 12. Stopoff paths 60 and 61 are applied to the surface 18 of blank 12 to couple notch 54 to area 44, and notch 56 to area 40. A plurality of apertures 63 are provided in blank 12 to couple the stopoff coated areas to each other.

An aperture 64 is provided in cover sheets 33a, and 33b, composite layers 22a and 22b, and foil sheets 24a and 24b of blanks 11 and 13, respectively, providing communication between the notches 54 and 56 and the interior portions of the blanks 11 and 13 for reasons subsequently discussed.

Illustrated in FIG. 3 is the stack 10 shown mounted in forming apparatus 37 (with only the three workpieces 11, 12 and 13 illustrated). A single continuous edge of the stack 10 is effectively constrained between upper tooling frame 72 and lower tooling frame 74 of the forming apparatus 37. This insures that those portions of the blanks of the stack to be formed, will be stretched rather than drawn. Should it be desired, additional tightening means such as bolts (not shown) can be employed to more effectively constrain the stack 10. Another additional tightening means that could be employed is a press, preferably hydraulic having platens 80. Forming apparatus 37 is positioned between platens 80 and compressed thereby assuring that the stack 10 is effectively constrained and chamber 82 of upper tooling frame 74 sealed from the air. This arrangement is particularly advantageous as the platens 80 can be made of ceramic material and resistance heated wires 84 can be provided therein for heating the stack 10 to the forming temperature.

For contamination prevention and diffusion bonding of the stack 10 within the forming apparatus 37, an environmental control system is provided. The purpose of the system is to expose the stack 10 only to inert gas or vacuum while heating, forming, and bonding, and to diffusion bond the stack by fluid pressure. The blanks of stack 10 will not react with inert gas due to the nature of inert gas, even at the elevated forming and bonding temperatures. In a high vacuum, there are substantially no elements for the stack 10 to react with. Thus, in a vacuum or inert gas environment, contamination of the stack 10 will be prevented.

A line 92 is connected to a source of pressurized inert gas (not shown) at one end and to chamber 82 through orifice 94 in upper tooling frame 72. A valve 96 for governing the flow of inert gas through line 92 into chamber 82 and a pressure gauge 98 to indicate pressure are provided. The inert gas used is preferably argon. Line 92 also functions as an outlet for inert gas in chamber 82 and could also be connected to a source of vacuum, such as a suction pump (not shown) for creating a vacuum in chamber 82. When line 92 is used as an outlet, valve 96 governs flow of inert gas from chamber 82. An additional line 100 is optimally provided on the opposite side of tooling frame 72 of the apparatus 37 and functions as an outlet for inert gas in chamber 82. Line 100 is connected to chamber 82 through orifice 104 in upper tooling frame 72. Line 100 has a valve 106 provided therein for regulation of inert gas flow from chamber 82. Line 100 can simply function as a vent or be connected to a source of vacuum, such as a suction pump (not shown).

As previously stated, the contamination prevention system can also function as a means for gas pressure diffusion bonding stack 10. Thus, when stack 10 is placed in forming apparatus 37 as illustrated in FIG. 3, the stack can be heated in an inert gas atmosphere to a suitable diffusion bonding temperature (approximately 1700° F. when the metal blanks of stack 10 are of Ti-6Al-4V) by heat generated from heating platens 80. Pressure is then applied to stack 10 by increasing the pressure in chamber 82 by adding additional pressurized inert gas through line 92 while maintaining line 100 closed by valve 106. In this manner, the untreated areas of stack 10 will be diffusion bonded by the application of such pressure, which is normally within the range of approximately 100 psi to 600 psi, but preferably approximately 500 psi for Ti-6Al-4V. Forming times, which depends on the thickness of stack 10, may vary from 30 minutes to 12 hours. The application of this pressure will also cause the respective consolidation of the various sheets of workpieces 11 and 13, such that each blank 11 and 13 will be a homogeneous matrix with an inner layer or layers of filamentary reinforcements. The edges of the blanks of stack 10 may also be diffusion bonded if desired by virtue of sealing pressure thereon in the form of the weight of upper tooling frame 72 and optionally pressure from a press and/or a clamping means. After diffusion bonding stack 10, excess inert gas would be removed from chamber 82 through lines 92 and 100 to allow for inflation of stack 10.

To aid in the diffusion bonding process, a vacuum can be drawn (prior to bonding) through lines 50 and 52 by coupling the lines to a vacuum pump (not shown) and opening fluid control valves 110 and 112, respectively. Not only with the air between the blanks 11, 12, and 13 be removed, but also between the sheets making up the blanks 11 and 13 via apertures 64. While gas diffusion bonding in the forming apparatus 37 is the preferred approach, it should be understood that the stack 10 could be press diffusion bonded outside the forming apparatus prior to insertion therein.

Before expanding stack 10, the pressure in chamber 82 is reduced through lines 92 and 100. At superplastic forming temperature, which is generally 1650°–1750° F. for Ti-4V-6Al alloy, the stack 10 is expanded by flowing pressurized inert gas through lines 50 and 52 while, optimally, a vacuum is drawn from chamber 82 through lines 92 and 100. The pressurized inert gas, which protects the interior of stack 10 from contamination at the elevated forming temperatures, flows from tubes 50 and 52 into notches 54 and 56, respectively, whereupon the inert gas flows within stack 10. Such pressurized inert gas within stack 10 forces the expansion of stack 10 due to the pressure differential between the interior of stack 10 and chamber 82. The pressure differential normally used for superplastic forming of Ti-6Al-4V is in a range of from 25 to 250 psi.

Blank 13 is initially lifted by the pressure differential and pulls with it the selected joined areas of blank 12. Such expansion allows the pressurized inert gas to flow through apertures 63 to provide an equal pressure within the stack 10 so that the blank 12 is formed uniformly. The equal pressure also retains blank 11 in its initial position as it is being forced against the lower tooling frame 74.

It should be noted that any attempt to substantially superplastically form the inner portions 26b of blank 13 will result in substantial breakage of the filaments therein. This is because the matrix material is in a superplastic condition, while the filamentary material is not. In this regard the matrix material elongates and large tension loads are induced into the filamentary material due to adherence of the matrix material causing the breakage. This, of course, is avoided in the subject process by limiting the location of the filamentary material to the inner portions 26a of the blank 13, whose area is selected to equal that of the flat portion 116 of the cavity 82 of the upper tooling frame 72. Thus, with further reference to FIG. 12, which is an enlarged cross-sectional view of the completed sandwich structure 34 shown in FIG. 4, substantially all the superplastic forming is limited to the frame portions 30a which expand against inclined portions 118 and 119 of the cavity 82. Since the blank 11 is not expanded in this example, the inner portions 26a containing the filamentary material can be expanded in area as desired.

FIGS. 5 and 6 illustrate the use of a differently configured lower tooling frame 120 having a chamber 122 with inclined portions 124 and 126 and flat portion 152. Lines 140 and 142 are provided in lower tooling frame 120 for creating an inert gas environment in chamber 122 and to act as vents or vacuum lines when superplastically expanding stack 10. For diffusion bonding, the pressure in both chambers 82 and 122 would have to be increased, preferably equally, so that a suitable pressure is applied to stack 10 for diffusion bonding. For superplastically expanding stack 10, the pressure within stack 10 would be increased by allowing flow of inert pressurized gas into stack 10 through lines 50 and 52 so that the pressure within stack 10 is greter than that in chambers 82 and 122. Additionally, the pressure in chambers 82 and 122 would have been reduced and optimally exposed to vacuum through lines 140, 142, 92, and 100.

As shown in FIG. 6, since all three of the blanks of stack 10 would be superplastically expanded, each of the blanks must be of a material having superplastic characteristics. As illustrated, blank 13 is forced upwards into chamber 82 while blank 11 is forced downward into chamber 122, and blank 12, by virtue of being selectively joined at specified locations to both blank 11 and blank 13 is deformed in both directions and forms the core of the sandwich structure as shown. In this example, since both blanks 11 and 13 are to be expanded, the filamentary material in blank 11 must also be limited in areas to the flat portion 152 of tooling frame 120.

FIG. 7 illustrates the positioning of an inflation tube 210 relative to a four-piece stack 212 in a forming apparatus 213 having upper and lower chambers 214 and 216, respectively. The stack 212 comprises outer blanks 217 and 218 similar to blanks 11 and 13, respectively, and two core blanks 219 and 220. Inflation tube 210 is positioned within a notch 222 in blanks 219 and 220 similar to the notch 54 shown in FIG. 1 which allows for positioning of the inflation tube 210 between members 217 and 218. Apertures 230 are provided for transmitting inflation gas through areas 232 coated with a stopoff for which no bonding is desired. Illustrative views of the final formed sandwich structure 240 of FIG. 7 are shown at FIGS. 8 and 9.

Illustrated in FIG. 10 is the forming apparatus 37 wherein a two workpiece stack 250 composed of blanks 252 and 254 is shown installed therein. The blanks 252 and 254 are similar in construction to blanks 11 and 13, respectively, shown in FIG. 1. If press diffusion bonding is to be used, the blanks 254 and 252 would first be selectively treated with a suitable stopoff material so that only certain predetermined areas (the periphery) of the stack would be joined along with the respective consolidation of the various sheets of blanks 254 and 252. Optimally, however, the stack 252 would be unjoined upon insertion into the forming apparatus 37. The stack 250 would be diffusion bonded (at the periphery thereof) by the application of pressure by the tooling frames 72 and 74. Pressurized gas in chamber 82 would effect respective consolidation of the various sheets of blanks 254 and 252. Recesses (not shown) which define cylindrical chambers (not shown) in the blanks 254 and 252 allow the inflation tubes 50 and 52 to be located therein. Inflation of the stack 250 is accomplished as in the previous examples (for stack 10) resulting in a two sheet expanded structure as illustrated in FIG. 11 (with filamentary material in blank 254 limited to the flat portion against surface 116).

For purposes of illustration, both under blanks in the Figures contained filamentary material and in most structures this would be the case. But it must be understood that it is not a necessity and the filamentary material could be limited to only one outer blank which is to be expanded. In the case where the structure comprises only two blanks and multiple portions are to be superplastically formed (an example of which can be found in U.S. Pat. No. 3,927,817, "Method of Making Metallic Sandwich Structures," by Hamilton, et al.), both blanks could be thus formed but, again, the forming which involves more than minimal bending must be limited to the areas that do not contain the reinforcing material.

Thus, it is apparent that there has been provided, in accordance with the invention, a method for making metallic sandwich structures from a plurality of workpieces that fully satisfies the objectives, aims, and advantages set forth above. While the invention has been described in conjunction with specific embodiments thereof, it is evident that many alternatives, modifications, and variations, will be apparent to those skilled in the art in light of the foregoing description. Accordingly, it is intended to embrace all such alternatives, modifications, and variations which fall within the spirit and scope of the appended claims.

What is claimed is:

1. A method of making a metallic structure from a plurality of workpieces comprising:
   provising at least one die, said at least one die having a surface which is complementary to the shape of the structure;
   providing a plurality of metal blank workpieces having two opposed principal surfaces, at least one of said workpieces being a composite workpiece having a multi-number of sheets, said at least one composite workpiece comprising two cover sheets and at least one inner sheet, at least a portion of said at least one inner sheet being a reinforced portion, said reinforced portion being of metal matrix material reinforced with filamentary material, said at least one inner sheet sandwiched between said cover sheets, said cover sheets extending beyond the periphery of said reinforced portion such that a margin around said reinforced portion is defined, said cover sheets having superplastic characteristics;
   treating said workpieces at selected areas to prevent bonding at those areas;
   positioning said workpieces in a stack, contacting at their principal surfaces with a composite workpiece being an outer workpiece;
   enclosing a chamber by positioning said stack of workpieces relative to said at least one die;
   heating said stack to within a temperature range sufficient to produce diffusion bonding of said workpieces at preselected untreated areas under coordinated temperature-pressure-time duration conditions;
   applying compressive pressure to said stack sufficient for diffusion bonding of said workpieces;
   maintaining said pressure and said heating for a time duration sufficient to produce diffusion bonding of said workpieces at said preselected areas and to consolidate said outer composite workpiece into a unitary workpiece comprising an interior reinforced portion and a peripheral monolithic portion, said peripheral monolithic portion being at said margin area, said interior reinforced portion including the reinforced portion of said at least one inner sheet of said outer composite workpiece; and
   applying a pressure loading across the principal surfaces of said outer composite workpiece to induce tensile stress therein and cause at least a part of said peripheral monolithic portion to superplastically form into said chamber and against said surface of said at least one die.

2. The method of claim 1 wherein said outer composite workpiece is caused to be formed into said chamber and against said surface of said die, and wherein said forming of said outer composite workpiece is such that bending of said interior reinforced portion of said outer composite workpiece is minimal.

3. The method of claim 2 wherein said surface of said at least one die is shaped to insure that bending of said interior reinforced portion of said outer composite workpiece is minimal during forming of said outer composite workpiece against said surface of said at least one die.

4. The method of claim 3 wherein said interior reinforced portion of said outer composite workpiece is substantially flat after forming said outer composite workpiece.

5. The method of claim 1 or 3 wherein said at least one inner sheet also includes a monolithic frame portion having a central hole complementary to the periphery of said reinforced portion, said reinforced portion being positioned in said hole such that said frame portion essentially frames said reinforced portion.

6. The method of claim 5 wherein said at least one composite workpiece is consolidated during said maintaining step into a unitary workpiece comprising an interior reinforced portion and a peripheral monolithic portion, said peripheral monolithic portion being at said margin area, and said interior reinforced portion including said reinforced portion.

7. The method of claim 1 wherein first and second chambers are enclosed by positioning said stack relative to said at least one die, both outer workpieces of said stack are composite workpieces, and said pressure loading is applied across the principal surfaces of said outer composite workpieces causing at least a part of said monolithic portion of one outer workpiece to expand superplastically into said first chamber and against said surface of said at least one die and at least a part of said monolithic portion of the other outer workpiece to expand superplastically into said second chamber and against said surface of said at least one die.

8. The method of claim 7 wherein one outer composite workpiece is caused to be formed into said first chamber and against said surface of said at least one die and the other outer workpiece is caused to be formed into said second chamber and against said surface of said at least one die such that bending of said interior reinforced portion of said outer composite workpieces is minimal.

9. The method of claim 5 wherein said temperature range is suitable for superplastic forming.

10. The method of claim 8 wherein said temperature range is suitable for superplastic forming.

11. The method of claim 9 wherein said treating is accomplished by application of a suitable stopoff material, and wherein application of compressive pressure to said stack is by fluid pressure within said chamber.

12. The method of claim 10 wherein said treating is accomplished by application of a suitable stopoff material, and wherein application of compressive pressure to said stack is by fluid pressure within said chambers.

* * * * *